US012297789B2

(12) United States Patent
Hashimoto et al.

(10) Patent No.: US 12,297,789 B2
(45) Date of Patent: May 13, 2025

(54) ENGINE CONTROL DEVICE, ENGINE CONTROL METHOD, AND PROGRAM

(71) Applicant: MITSUBISHI HEAVY INDUSTRIES ENGINE & TURBOCHARGER, LTD., Sagamihara (JP)

(72) Inventors: Naoki Hashimoto, Sagamihara (JP); Ko Takayanagi, Tokyo (JP); Masataka Shiraishi, Sagamihara (JP); Yuta Furukawa, Sagamihara (JP); Yosuke Kitamura, Sagamihara (JP); Yuki Koyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/276,421

(22) PCT Filed: Dec. 2, 2021

(86) PCT No.: PCT/JP2021/044290

§ 371 (c)(1),
(2) Date: Oct. 2, 2023

(87) PCT Pub. No.: WO2022/172559

PCT Pub. Date: Aug. 18, 2022

(65) Prior Publication Data

US 2024/0110532 A1 Apr. 4, 2024

(30) Foreign Application Priority Data

Feb. 12, 2021 (JP) ................................ 2021-020659

(51) Int. Cl.
*F02D 41/14* (2006.01)
*F02D 41/00* (2006.01)

(52) U.S. Cl.
CPC ..... *F02D 41/1495* (2013.01); *F02D 41/0007* (2013.01); *F02D 41/1446* (2013.01);
(Continued)

(58) Field of Classification Search
CPC ............ F02D 41/1446; F02D 41/0027; F02D 41/0007; F02D 41/1495
See application file for complete search history.

(56) References Cited

U.S. PATENT DOCUMENTS 8,302,385 B2 11/2012 Sujan
2004/0003805 A1 1/2004 Ono et al.
(Continued)

FOREIGN PATENT DOCUMENTS

AU 2019222845 A1 3/2020
EP 2 275 658 A1 1/2011
(Continued)

OTHER PUBLICATIONS

International Search Report for International Application No. PCT/JP2021/044290, dated Jan. 25, 2022, with English translation.
(Continued)

*Primary Examiner* — Kevin A Lathers
(74) *Attorney, Agent, or Firm* — BIRCH, STEWART, KOLASCH & BIRCH, LLP

(57) ABSTRACT

Provided is an engine control device for controlling an opening degree of a valve adjusting a flow rate of an air-fuel mixture of an engine, wherein the opening degree is corrected based on an exhaust temperature deviation which is a deviation between a reference value and a current value of an exhaust temperature when controlling the opening degree.

7 Claims, 11 Drawing Sheets

(52) U.S. Cl.
CPC .. *F02D 41/0027* (2013.01); *F02D 2200/0406* (2013.01); *F02D 2200/0411* (2013.01)

(56) References Cited

U.S. PATENT DOCUMENTS

| | | | | |
|---|---|---|---|---|
| 2009/0076709 | A1 * | 3/2009 | Shiraishi | F02D 41/0027 701/103 |
| 2013/0245967 | A1 * | 9/2013 | Hagari | G06F 17/10 702/45 |
| 2018/0003118 | A1 | 1/2018 | zur Loye et al. | |
| 2019/0010886 | A1 | 1/2019 | Matsuzawa | |

FOREIGN PATENT DOCUMENTS

| | | | |
|---|---|---|---|
| JP | 7-71322 | A | 3/1995 |
| JP | 11-229934 | A | 8/1999 |
| JP | 2003-148217 | A | 5/2003 |
| JP | 2009-57873 | A | 3/2009 |
| JP | 5033029 | B2 | 9/2012 |
| JP | 2015-132206 | A | 7/2015 |
| JP | 2016-169712 | A | 9/2016 |
| JP | 2019-15239 | A | 1/2019 |
| JP | 2020-37912 | A | 3/2020 |
| WO | WO 2011/074598 | A1 | 6/2011 |

OTHER PUBLICATIONS

Written Opinion of the International Searching Authority for International Application No. PCT/JP2021/044290, dated Jan. 25, 2022, with English translation.

* cited by examiner

ENGINE CONTROL DEVICE, ENGINE CONTROL METHOD, AND PROGRAM

TECHNICAL FIELD

The present disclosure relates to an engine control device, an engine control method, and a program. Priority is claimed on Japanese Patent Application No. 2021-020659, filed Feb. 12, 2021, the content of which is incorporated herein by reference.

BACKGROUND ART

A four-cycle engine such as a four-cycle gas engine and a four-cycle gasoline engine undergoes aging deterioration that reduces the volumetric efficiency. The volumetric efficiency is a value that evaluates the intake action of the four-cycle engine. When the volumetric efficiency decreases, the amount of air that can be supplied into an engine cylinder decreases and hence an air-fuel ratio becomes rich. Accordingly, an exhaust temperature rises to increase NOx (nitrogen oxide) emissions. NOx emissions are regulated by national and local governments and these engines need to be operated within the regulation values.

A gas engine control device described in Patent Literature 1 corrects an opening degree of a fuel gas supply amount adjustment valve using a predetermined opening degree correction value with respect to a decrease in intake air flow rate due to deterioration over time. This gas engine control device includes opening degree adjustment means for adjusting fuel gas supply amount adjustment means so that a combustion variation value based on an engine rotation speed difference between an instantaneous engine rotation speed in a combustion stroke of each engine cylinder in a combustion cycle and an average engine rotation speed in one combustion cycle converges to a target combustion variation value based on an engine load and calculates an opening degree correction value based on a maximum value and a minimum value of the opening degree in a process of convergence to the target combustion variation value by forcibly increasing or decreasing the opening degree of the fuel gas supply amount adjustment valve calculated based on the target combustion variation value at a predetermined time by a predetermined amount.

CITATION LIST

Patent Literature

[Patent Literature 1]
Japanese Patent No. 5033029

SUMMARY OF INVENTION

Technical Problem

As described above, in the gas engine control device described in Patent Literature 1, the opening degree of the fuel gas supply amount adjustment valve calculated based on the target combustion variation value needs to be forcibly increased or decreased by a predetermined amount when calculating the opening degree correction value. Therefore, there is a problem that the gas engine control device cannot be easily used in an environment in which it is difficult to forcibly increase or decrease the opening degree of the fuel gas supply amount adjustment valve by a predetermined amount.

The present disclosure has been made to solve the above-described problems and an object thereof is to provide an engine control device, an engine control method, and a program capable of easily calculating a correction value in engine control.

Solution to Problem

In order to solve the above-described problems, an engine control device according to the present disclosure corrects an opening degree of a valve adjusting a flow rate of an air-fuel mixture of an engine based on an exhaust temperature deviation which is a deviation between a reference value and a current value of an exhaust temperature when controlling the opening degree.

An engine control method according to the present disclosure includes correcting an opening degree of a valve adjusting a flow rate of an air-fuel mixture of an engine based on an exhaust temperature deviation which is a deviation between a reference value and a current value of an exhaust temperature when controlling the opening degree.

A program according to the present disclosure allows a computer to execute a step of correcting an opening degree of a valve adjusting a flow rate of an air-fuel mixture of an engine based on an exhaust temperature deviation which is a deviation between a reference value and a current value of an exhaust temperature when controlling the opening degree.

Advantageous Effects of Invention

According to the engine control device, the engine control method, and the program of the present disclosure, it is possible to easily calculate a correction value in engine control.

DESCRIPTION OF EMBODIMENTS

First Embodiment

Figure 1:
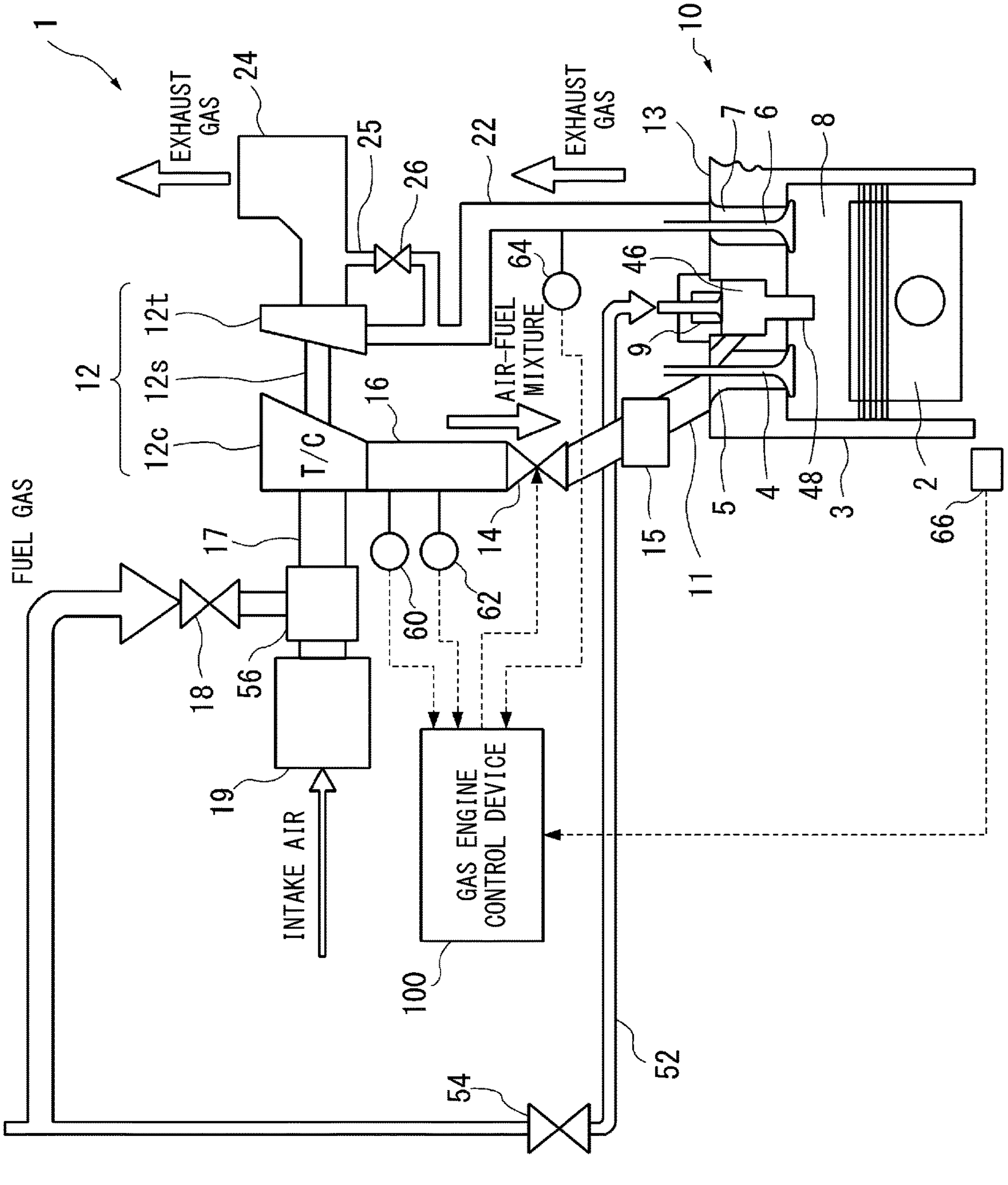
FIG. 1 is a schematic configuration diagram showing an engine according to an embodiment of the present disclosure.

Hereinafter, a gas engine control device (engine control device), a gas engine control method (engine control method), and a program according to a first embodiment of the present disclosure will be described with reference to FIGS. 1 to 4. In each drawing, the same reference numerals are used for the same or corresponding configurations, and the description thereof will be omitted as appropriate.

(Configuration of Engine)

FIG. 1 is a schematic configuration diagram of an engine 1 according to at least one embodiment of the present disclosure. The engine 1 is a gas engine that uses a fuel gas as fuel, and is, for example, a power generation engine that outputs power to a generator (not shown) for generating power in a power plant or the like. Further, the engine 1 shown in FIG. 1 is a gas engine capable of outputting power by combusting an air-fuel mixture produced by mixing a fuel gas with intake air (air). The engine 1 is a so-called premixed internal combustion engine in which a fuel gas supplied from a gas flow rate control valve 18 on the upstream side of a combustion chamber 8 and an intake air taken from the outside are premixed to produce an air-fuel mixture and the air-fuel mixture is taken into the combustion chamber 8 through an intake pipe 18 having a predetermined length.

When the engine 1 is used as the power generation engine, the engine 1 is used, for example, as a power source for a generator in a power plant, and the engine 1 is mainly subjected to combustion control and air-fuel ratio control. In the combustion control, feedback control is performed by using an output rotation speed or load as a control amount and using a fuel gas supply amount as an operation amount in order to keep the output rotation speed and load of the engine 1 constant. On the other hand, in the air-fuel ratio control, feedback control is performed by indirectly using an air-fuel ratio as a control amount and directly using a pressure or air-fuel mixture flow rate of an intake manifold 11 as a control amount in order to keep the air-fuel ratio of the combustion chamber 8 constant. Accordingly, an opening degree of a throttle valve 14 disposed in front of the intake manifold 11 or an opening degree of an exhaust bypass valve 26 provided in an exhaust bypass passage 25 is adjusted as an operation amount.

The engine 1 shown in FIG. 1 includes at least one engine cylinder 10. In this embodiment, the engine 1 includes the plurality of engine cylinders 10, but only one engine cylinder 10 is representatively shown in FIG. 1 for easy understanding. The engine cylinder 10 includes a cylinder 3 which is integrally formed with a cylinder block 13 and a piston 2 which is movable inside the cylinder in a reciprocating manner. In the engine 1, an intake port 5 opened or closed by an intake valve 4 and an exhaust port 7 opened or closed by an exhaust valve 6 are connected to the cylinder 3 through which the piston 2 slides. The combustion chamber 8 is formed between the cylinder 3 and the piston 2 and an ignition plug 9 is provided in the combustion chamber 8.

The intake manifold 11 is connected to the intake port 5, the throttle valve 14 is connected to the upper end of the intake manifold 11, and a compressor **12*c* of a turbocharger 12 is connected to an upstream intake pipe 16. An intercooler 15 is connected to an intermediate portion of the intake manifold 11. Further, the gas flow rate control valve 18 which supplies gas fuel is connected to a mixer 56 connected to an intermediate portion of an intake pipe 17 connected to the compressor 12*c* and an air cleaner 19 is connected to an upstream end. Further, an intake manifold pressure sensor 60 and an intake manifold temperature sensor 62 which respectively measure the pressure and the temperature of the air-fuel mixture flowing through the intake pipe 16 (the pressure and the temperature of the intake manifold 11) are provided in the intake pipe 16 (or the intake manifold 11). The detection values of the intake manifold pressure sensor 60 and the intake manifold temperature sensor 62 are input to a gas engine control device 100** as electrical signals.

In the mixer 56, an air-fuel mixture is produced by mixing an intake air (outside air) taken from the outside and a fuel gas. The air-fuel mixture which is produced by the mixer 56 is supplied to the intake port 5 through the intake pipe 16. The flow rate of the air-fuel mixture supplied to the intake port 5 is adjusted by controlling the opening degree of the throttle valve 14.

On the other hand, an exhaust manifold 22 is connected to the exhaust port 7 and a turbine **12*t* of the turbocharger 12 is connected to the downstream end thereof. The compressor 12*c* and the turbine 12*t* of the turbocharger 12 rotate integrally through a rotating shaft 12*s*. An exhaust pipe 24 is connected to the turbine 12*t* and the exhaust bypass valve 26 is provided in the exhaust bypass passage 25 which connects the exhaust pipe 24 and the exhaust manifold 22. The exhaust manifold 22 is provided with an exhaust temperature sensor 64 which measures the temperature of the exhaust gas flowing through the exhaust manifold 22. The detection value of the exhaust temperature sensor 64 is input to the gas engine control device 100 as an electrical signal. Additionally, the exhaust temperature sensor 64 is provided for each engine cylinder 10**.

Further, the cylinder block 13 is provided with an auxiliary chamber metal opening 48 having a sub-combustion chamber 46. A plurality of injection holes (not shown) for injecting flame into the combustion chamber 8 are formed around the tip of the auxiliary chamber metal opening 48. A fuel gas is supplied to the sub-combustion chamber 46 through a sub-fuel gas supply line 52 and flame is formed by the ignition plug 9 provided inside the sub-combustion chamber 46. The flame formed in the sub-combustion chamber 46 is blown into the combustion chamber 8 in a torch shape from an injection hole, so that efficient combustion is performed in a wide range of the combustion chamber 8. Additionally, the sub-fuel gas supply line 52 is provided with an adjustment valve 54 for adjusting a fuel gas supply amount to the sub-combustion chamber 46.

In the engine 1 with such a configuration, air sucked from the air cleaner 19 is injected with gas fuel through the gas flow rate control valve 18 in the mixer 56 to form an air-fuel mixture (gas mixed with fuel), is compressed by the compressor **12*c* of the turbocharger 12, and is supercharged in the cylinder 3 through the throttle valve 14 and the intake manifold 11 to operate the engine 1. The air-fuel mixture is cooled by the intercooler 15 to remove heat of compression, and the flow rate is adjusted by adjusting the valve opening degree of the throttle valve 14**.

Further, an exhaust gas discharged from the cylinder 3 is supplied to the turbine 12*t* of the turbocharger 12 through the exhaust manifold 22 to rotate the turbine 12*t* at a high speed. This rotation drives the compressor 12*c* at a high speed through the rotating shaft 12*s* to continue compressing and supercharging fresh air. Further, when the valve opening degree of the exhaust bypass valve 26 provided in the exhaust bypass passage 25 is adjusted, the flow rate of the exhaust gas flowing to the turbine 12*t* is adjusted and the air compression amount in the compressor 12*c* is adjusted. Thus, it is possible to adjust the flow rate of the air-fuel mixture supplied to the intake port 5 by controlling the opening degree of the exhaust bypass valve 26.

The gas engine control device (engine control device) 100 is connected to the gas flow rate control valve 18, the throttle valve 14, the exhaust bypass valve 26, the intake manifold pressure sensor 60, the intake manifold temperature sensor 62, the exhaust temperature sensor 64, an engine rotation speed sensor 66 connected to a crankshaft (not shown), and the like to acquire detection values of the sensors and controls the throttle valve 14, the exhaust bypass valve 26, and the like.

(Configuration of Gas Engine Control Device)

Figure 2:
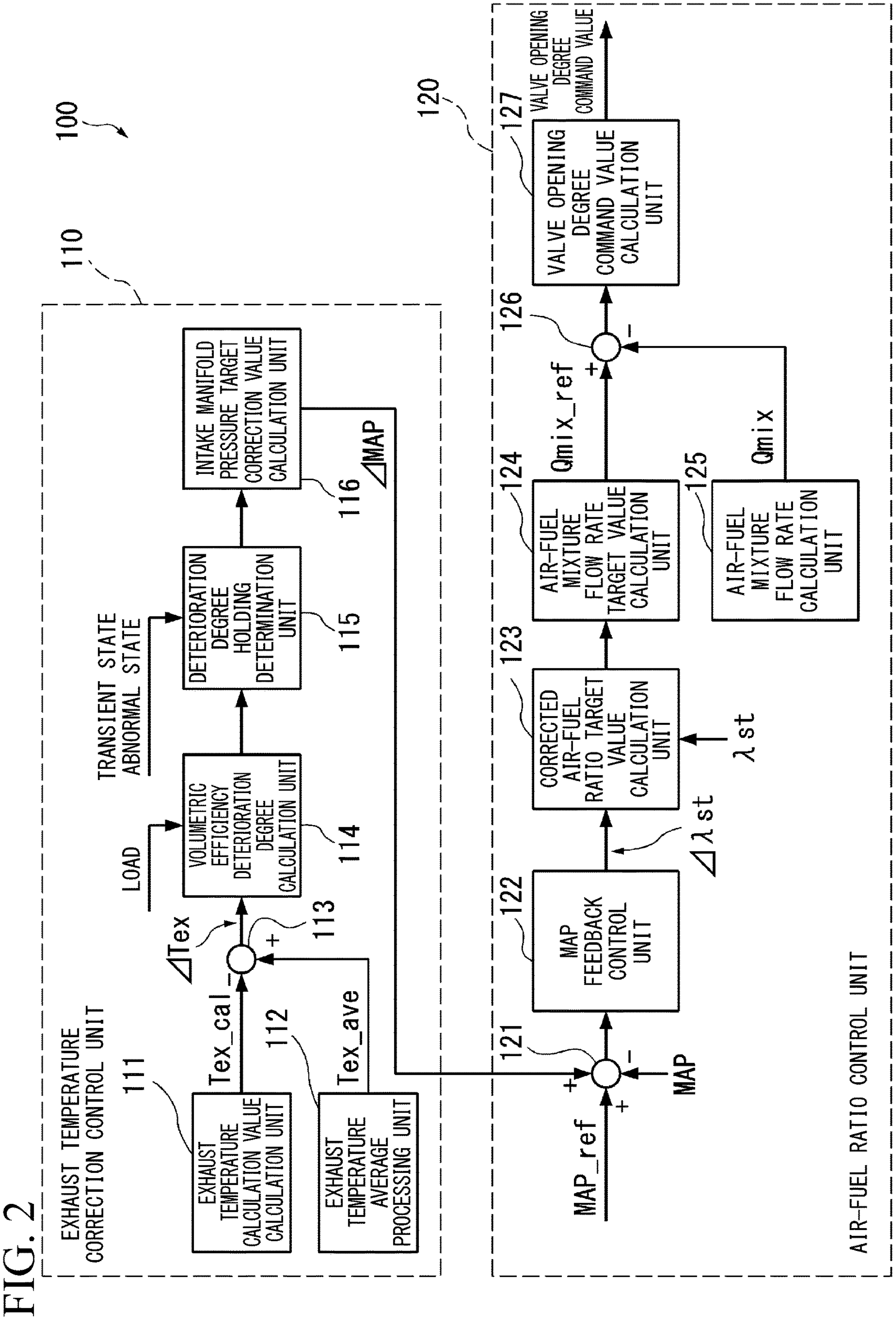
FIG. 2 is a block diagram showing a configuration example of a gas engine control device according to a first embodiment of the present disclosure.

The gas engine control device 100 includes a computer and peripheral circuits or peripheral devices of the computer and includes an exhaust temperature correction control unit 110 and an air-fuel ratio control unit 120 shown in FIG. 2 as a functional configuration formed by the combination of hardware such as the computer and peripheral circuits or peripheral devices and software such as a program executed by the computer. Further, the exhaust temperature correction control unit 110 includes an exhaust temperature calculation value calculation unit 111, an exhaust temperature average processing unit 112, an adder 113, a volumetric efficiency deterioration degree calculation unit 114, a deterioration degree holding determination unit 115, and an intake manifold pressure target correction value calculation unit 116. Further, the air-fuel ratio control unit 120 includes an adder 121, a MAP feedback control unit 122, a corrected air-fuel ratio target value calculation unit 123, an air-fuel mixture flow rate target value calculation unit 124, an air-fuel mixture flow rate calculation unit 125, an adder 126, and a valve opening degree command value calculation unit 127. Here, FIG. 2 is a block diagram showing a configuration example of the gas engine control device 100 according to the first embodiment of the present disclosure. Additionally, the gas engine control device 100 according to this embodiment can perform both the combustion control and the air-fuel ratio control, but only the functional configuration related to the air-fuel ratio control is shown in FIG. 2.

Additionally, in the air-fuel ratio control of this embodiment, the target value of the pressure of the intake manifold 11 (hereinafter, also referred to as the intake manifold pressure (MAP)) is determined in consideration of the effect of changes in the theoretical air-fuel ratio due to changes in fuel LHV (Lower Heating Value) and the intake manifold pressure (MAP) is feedback-controlled (MAP feedback control) to control the air-fuel ratio to the target value.

The exhaust temperature calculation value calculation unit 111 calculates a calculation value (reference value) of the exhaust temperature at a reference volumetric efficiency from the control value of the engine 1. The exhaust temperature calculation value Tex_cal is expressed by the following formula.

$$\text{Tex\_cal} = \frac{Cps}{Cpex} \times MAT \times \frac{Qex}{Qmix * Cpex} \quad \text{[Math. 1]}$$

Here, Cps indicates the supply air constant pressure specific heat, Cpex indicates the exhaust gas constant pressure specific heat, MAT indicates the intake manifold temperature (the temperature of the intake manifold 11), Qex indicates the total heating value, and Gmix indicates the air-fuel mixture flow rate. Further, the total heating value Qex uses one of the following two formulas.

[Math. 2]

$$Qex = (\text{GENERATED POWER}) \times (1 - \eta th - \eta hl) \quad (1)$$

[Math. 3]

$$Qex = \text{LHV} \times G\text{gas} \times (1 - \eta th - \eta hl) \quad (2)$$

Here, LHV indicates the lower heating value of the fuel, ηth indicates the power generation efficiency, ηhl indicates the heat loss, and Ggas indicates the fuel gas flow rate.

Additionally, Formula (1) is suitable for this control system because this formula is less susceptible to LHV variations and load variations.

The exhaust temperature average processing unit 112 obtains an exhaust temperature average value Tex_ave from the exhaust temperature acquired value from each exhaust temperature sensor 64 of each engine cylinder 10. The exhaust temperature acquired value varies for each engine cylinder 10. Furthermore, when a misfire occurs, the difference from other cylinders becomes too large to calculate an appropriate average value and hence an average value is obtained by omitting the maximum and minimum values obtained by the sensor. This average value is the current value of the exhaust temperature.

The adder 113 calculates a deviation ΔTex (referred to as an exhaust temperature deviation) between the exhaust temperature calculation value Tex_cal and the exhaust temperature average value Tex_ave.

The volumetric efficiency deterioration degree calculation unit 114 calculates the volumetric efficiency deterioration degree based on the exhaust temperature deviation ΔTex and the load of the engine 1. The volumetric efficiency deterioration degree can be calculated, for example, using a map whose input are the load and the exhaust temperature deviation ΔTex. The volumetric efficiency deterioration degree is a value (for example, a value of 0 to 1 (0% to 100%)) indicating the degree (percentage) of deterioration with 1 (=100%) indicating no deterioration.

In the engine control of this embodiment, feedback control is performed by using the output rotation speed or load as a control amount and the fuel gas supply amount as an operation amount in order to keep the output rotation speed and load of the engine 1 constant in the combustion control. In this case, since the air-fuel mixture amount in the engine cylinder decreases when the volumetric efficiency decreases, excessive fuel is supplied to hold the output in the combustion control and hence the exhaust temperature increases. Therefore, in the engine control of this embodiment, there is a certain correlation between the exhaust temperature deviation ΔTex and the volumetric efficiency deterioration degree. However, for example, even when the volumetric efficiency deterioration degree is the same, there is a variation such that ΔTex is about 20° C. to 30° C. when the load is 100% and ΔTex is about 10° C. to 20° C. when the load is 50% to 70%. Since it is necessary to calculate the volumetric efficiency deterioration degree in consideration of the variation, the volumetric efficiency deterioration degree is calculated based on the exhaust temperature deviation ΔTex and the load of the engine 1 in this embodiment.

The deterioration degree holding determination unit 115 holds the calculated deterioration degree in a transient state such as load application or load interruption or an abnormal state such as sensor abnormality and stabilizes the volumetric efficiency deterioration degree. A signal indicating whether or not the current state is the transient state and a signal indicating whether or not the current state is the abnormal state are input to the deterioration degree holding determination unit 115, and the deterioration degree holding determination unit 115 outputs the input exhaust temperature deviation ΔTex as it is when the current state is not the transient state or the abnormal state, and holds the output of the exhaust temperature deviation ΔTex input before the transient state or the abnormal state when the current state is the transient state or the abnormal state. Additionally, the transient state includes a case in which the load has increased by a predetermined value or more and a case in which the load has decreased by a predetermined value or more. Further, the abnormal state includes, for example, a case in which an abnormality occurs in the detection value of the exhaust temperature sensor 64 or the load measurement sensor.

The intake manifold pressure target correction value calculation unit 116 calculates a correction value according to the volumetric efficiency deterioration degree with respect to the target value in the MAP feedback control. The intake manifold pressure target correction value calculation unit 116 calculates and outputs a correction value ΔMAP (intake manifold pressure target correction value) for the target value of the intake manifold pressure according to the volumetric efficiency deterioration degree. A map that determines the value of the intake manifold pressure target correction value ΔMAP suitable for the volumetric efficiency deterioration degree can be determined based on simulations and actual measurements.

On the other hand, in the air-fuel ratio control unit 120, the adder 121 calculates and outputs a deviation (=intake manifold pressure deviation) between "target value MAP_ref+intake manifold pressure target correction value ΔMAP" and the measurement value MAP (=intake manifold pressure current value) by adding the intake manifold pressure target correction value ΔMAP to the target value MAP_ref of the intake manifold pressure (MAP) and subtracting the measurement value (=current value) of the intake manifold pressure (MAP) therefrom.

The MAP feedback control unit 122 calculates and outputs an air-fuel ratio target correction value Δλst which is a correction value for the target value of the air-fuel ratio of the air-fuel mixture as an operation amount of the feedback control based on the intake manifold pressure deviation which is a deviation between a value obtained by correcting the target value MAP_ref of the intake manifold pressure by the intake manifold pressure target correction value ΔMAP and a current value MAP of the intake manifold pressure. The control operation in the MAP feedback control unit 122 is not limited, but can be, for example, PI (proportional integral) operation. The MAP feedback control unit 122 changes the air-fuel ratio target correction value Δλst so that the intake manifold pressure deviation becomes zero. The air-fuel ratio target correction value Δλst is a correction value for matching the current value MAP of the intake manifold pressure with the target value MAP_ref of the intake manifold pressure according to the volumetric efficiency deterioration degree.

The air-fuel ratio target correction value Δλst and the theoretical air-fuel ratio (or the target air-fuel ratio) λst are input to the corrected air-fuel ratio target value calculation unit 123, and the corrected air-fuel ratio target value calculation unit 123 outputs a corrected air-fuel ratio target value which is a value obtained by correcting the theoretical air-fuel ratio (or the target air-fuel ratio) λst by the air-fuel ratio target correction value Δλst. For example, the corrected air-fuel ratio target value calculation unit 123 calculates the corrected air-fuel ratio target value by using maps and calculation formulas for obtaining the corrected air-fuel ratio target value using the air-fuel ratio target correction value Δλst and the theoretical air-fuel ratio (or the target air-fuel ratio) λst as parameters. These maps and calculation formulas can be determined based on simulations and actual measurements.

The air-fuel mixture flow rate target value calculation unit 124 calculates an air-fuel mixture flow rate target value Qmix_ref based on the theoretical air-fuel ratio (or the target air-fuel ratio) λst (=corrected air-fuel ratio target value) corrected by the air-fuel ratio target correction value Δλst. The air-fuel mixture flow rate target value Qmix_ref is a target value of the air-fuel mixture flow rate for obtaining the theoretical air-fuel ratio (or target air-fuel ratio) λst corrected by the air-fuel ratio target correction value Δλst. The air-fuel mixture flow rate target value calculation unit 124 calculates the air-fuel mixture flow rate target value Qmix_ref by being input the engine rotation speed, the intake manifold pressure MAP, the intake manifold temperature MAT, and the like as variables and by being input the total engine displacement, the atmospheric pressure, and the like as constants.

Further, the air-fuel mixture flow rate calculation unit 125 calculates the current air-fuel mixture flow rate Qmix by using the following formula.

$$Qmix = \frac{Ne \times V \times \eta v}{2 \times 60} \times \frac{MAP}{MAT} \times \frac{Tk}{Patm} \quad \text{[Math. 4]}$$

Here, Qmix: air-fuel mixture flow rate [L/sec], Ne: engine rotation speed [min−1], V: total engine displacement [L], ηv: reference volumetric efficiency [−], MAP: intake manifold pressure [Pa], MAT: intake manifold temperature [K], Tk: absolute temperature [K], Patm: atmospheric pressure [Pa].

The adder 126 calculates a deviation (air-fuel mixture flow rate deviation) between the air-fuel mixture flow rate target value Qmix_ref and the air-fuel mixture flow rate Qmix by subtracting the air-fuel mixture flow rate Qmix from the air-fuel mixture flow rate target value Qmix_ref.

The valve opening degree command value calculation unit 127 calculates the opening degree command value (valve opening degree command value) of the throttle valve 14 or the exhaust bypass valve 26 (both valves can be collectively referred to as the air-fuel mixture flow rate adjustment valve) based on the deviation (air-fuel mixture flow rate deviation) between the air-fuel mixture flow rate target value Qmix_ref and the current value (Qmix) of the flow rate of the air-fuel mixture. For example, the valve opening degree command value calculation unit 127 may be configured to calculate and output any one of the valve opening degree command value of the throttle valve 14 and the valve opening degree command value of the exhaust bypass valve 26, may be configured to calculate and output both valve opening degree command values, or may be configured to selectively calculate and output one valve opening degree command value according to a condition.

(Operation Example of Gas Engine Control Device)

Figure 3:
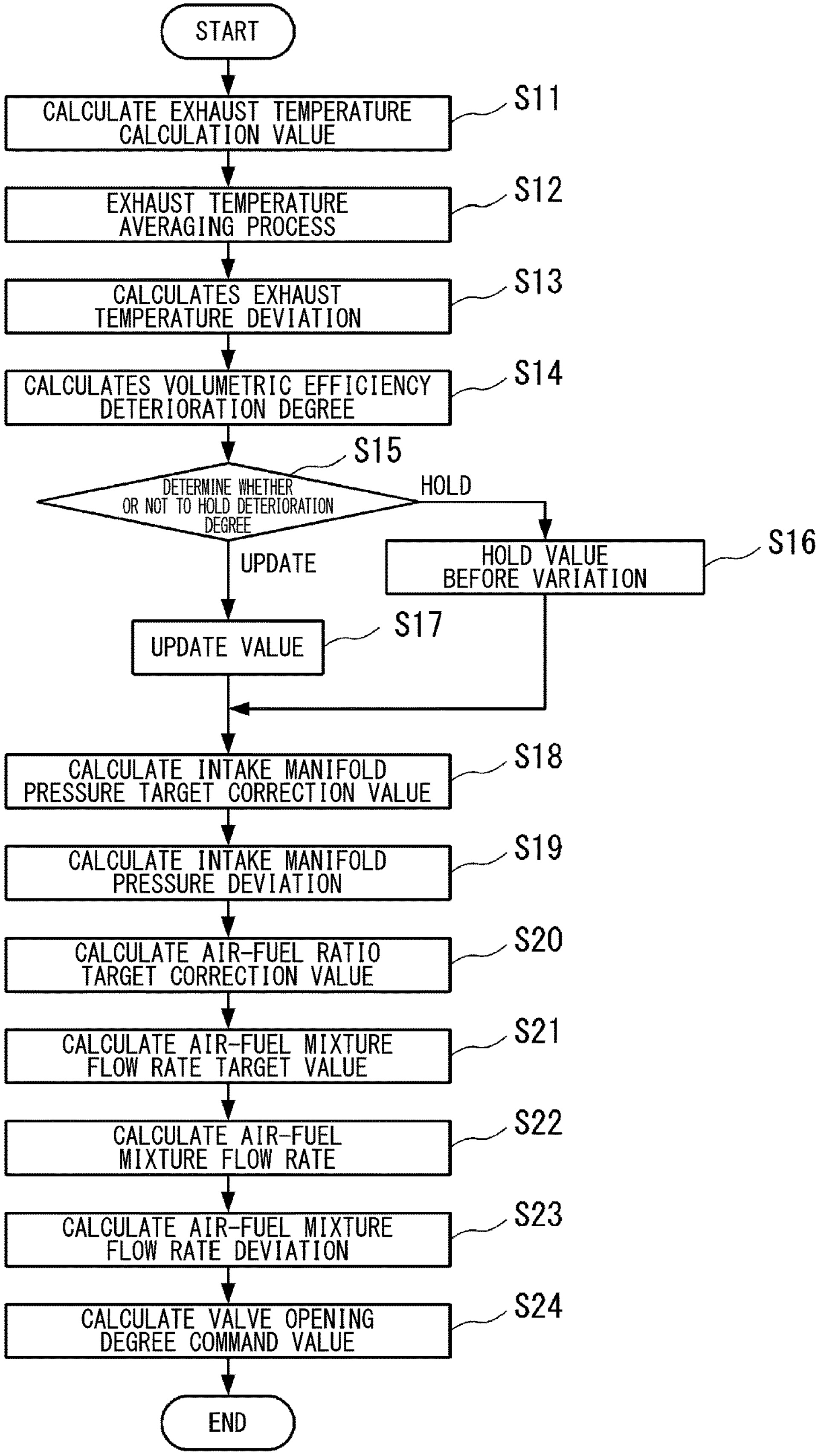
FIG. 3 is a flowchart showing an operation example of the gas engine control device according to the first embodiment of the present disclosure.

An operation example by the gas engine control device 100 shown in FIG. 2 will be described with reference to FIG. 3. FIG. 3 is a flowchart showing an operation example of the gas engine control device according to the first embodiment of the present disclosure. The process shown in FIG. 3 is repeatedly performed at a predetermined cycle.

When the process shown in FIG. 3 is started, the exhaust temperature calculation value calculation unit 111 first calculates the exhaust temperature calculation value Tex_cal (step S11). Next, the exhaust temperature average processing unit 112 calculates the exhaust temperature average value Tex_ave by performing an exhaust temperature averaging process (step S12). Next, the adder 113 calculates the exhaust temperature deviation ΔTex between the exhaust temperature calculation value Tex_cal and the exhaust temperature average value Tex_ave (step S13). Next, the volumetric efficiency deterioration degree calculation unit 114 calculates the volumetric efficiency deterioration degree (step S14). Next, the deterioration degree holding determination unit 115 determines whether or not to hold the deterioration degree (step S15), holds the volumetric efficiency deterioration degree at the value before variation in the case of holding (in the case of "hold" in step S15) (step S16), and updates the volumetric efficiency deterioration degree to a value calculated in step S14 in the case of not holding (in the case of "update" in step S15) (step S17). Next, the intake manifold pressure target correction value calculation unit 116 calculates the intake manifold pressure target correction value ΔMAP (step S18).

Next, the adder 121 calculates the intake manifold pressure deviation (step S19). Next, the MAP feedback control unit 122 calculates the air-fuel ratio target correction value Δλst (step S20). Next, the air-fuel mixture flow rate target value calculation unit 124 calculates the air-fuel mixture flow rate target value Qmix_ref based on a value obtained by correcting the theoretical air-fuel ratio (or the target air-fuel ratio) λst based on the air-fuel ratio target correction value Δλst by the corrected air-fuel ratio target value calculation unit 123 (step S21). Next, the air-fuel mixture flow rate calculation unit 125 calculates the air-fuel mixture flow rate Qmix (step S22). Next, the adder 126 calculates the air-fuel mixture flow rate deviation (step S23). Next, the valve opening degree command value calculation unit 127 calculates the valve opening degree command value, outputs the valve opening degree command value to the throttle valve 14 or the exhaust bypass valve 26 (step S24), and ends the process shown in FIG. 3.

In the above-described process, for example, if the throttle valve 14 is controlled in such a manner that the target MAP is increased by performing correction of adding the intake manifold pressure target correction value ΔMAP to the target value MAP_ref of the intake manifold pressure (MAP) when the volumetric efficiency deterioration degree increases, the throttle opening degree is operated to the opening side and hence the amount of air can be increased. If there is no exhaust temperature correction control according to this embodiment when the volumetric efficiency decreases, the air-fuel ratio λ becomes rich, but in this embodiment, the air-fuel ratio is corrected to be lean to suppress the NOx emission amount.

Operation and Effect of this Embodiment

According to this embodiment, a decrease in volumetric efficiency can be detected from the deviation between the exhaust temperature sensor acquired value and the calculation value. Further, according to this embodiment, feedback control can be performed using the exhaust temperature before deterioration as a target value (reference value), and correction control of the supplied air amount can be performed. Further, since an operation of increasing the amount of air is performed when the volumetric efficiency decreases, it is possible to suppress the emission of NOx by performing the air-fuel ratio control to be the lean air-fuel ratio λ. Further, according to this embodiment, since the intake manifold pressure target value is corrected when the volumetric efficiency deteriorates and the exhaust temperature increases, deterioration detection and deterioration correction can be performed by monitoring the exhaust temperature.

Further, in this embodiment, since it is possible to calculate the correction value for the engine control in the normal control, there is no restriction of forcibly increasing or decreasing the operation amount and the correction value for the engine control can be easily calculated.

(Simulation Result)

Figure 4:
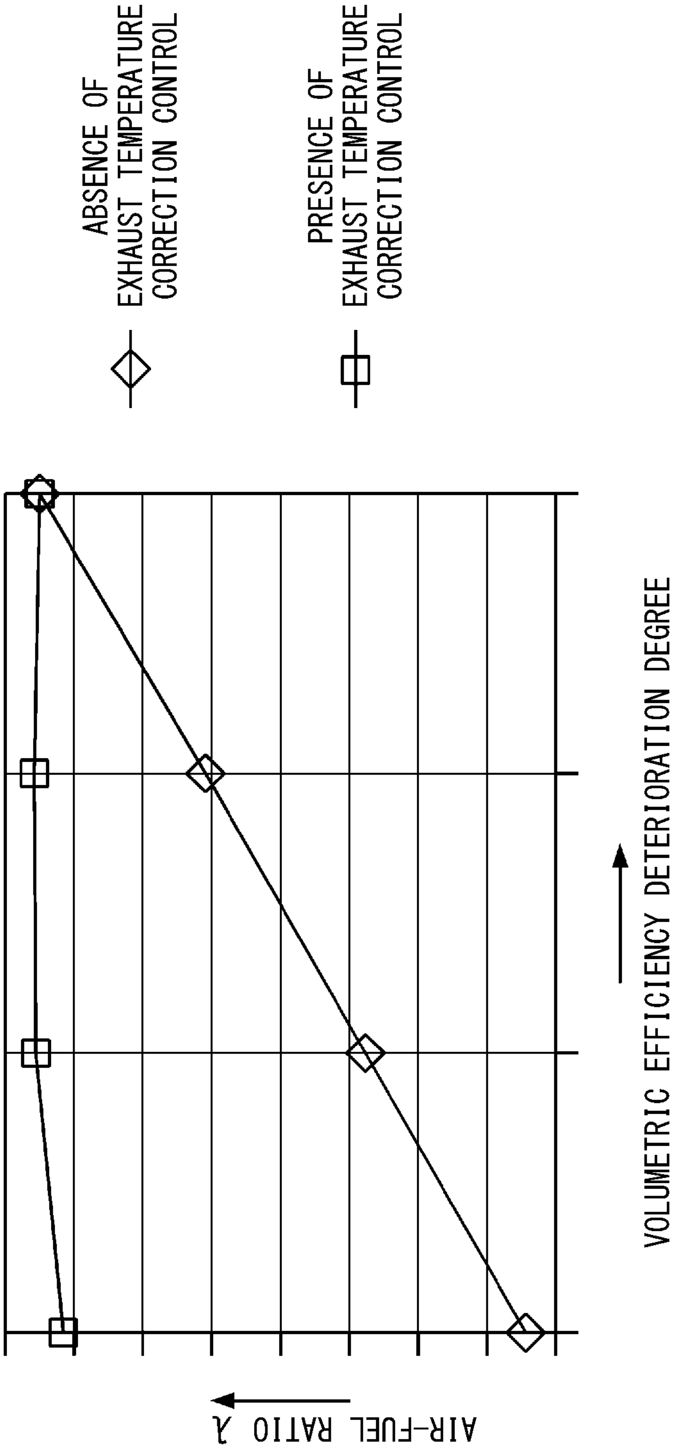
FIG. 4 is a characteristic diagram showing a simulation result of an operation example of the gas engine control device according to the first embodiment of the present disclosure.

FIG. 4 is a characteristic diagram showing a simulation result of an operation example of the gas engine control device according to the first embodiment of the present disclosure. The horizontal axis indicates the volumetric efficiency deterioration degree and the vertical axis indicates the air-fuel ratio λ. According to the simulation result, the air-fuel ratio λ would have become rich due to the deterioration of the volumetric efficiency when there is no exhaust temperature correction control according to this embodiment, but it was confirmed that the air-fuel ratio λ can be corrected to be lean by incorporating the exhaust temperature correction control according to this embodiment. That is, it was possible to confirm the NOx emission suppression effect of this embodiment from this simulation result.

Second Embodiment

Figure 5:
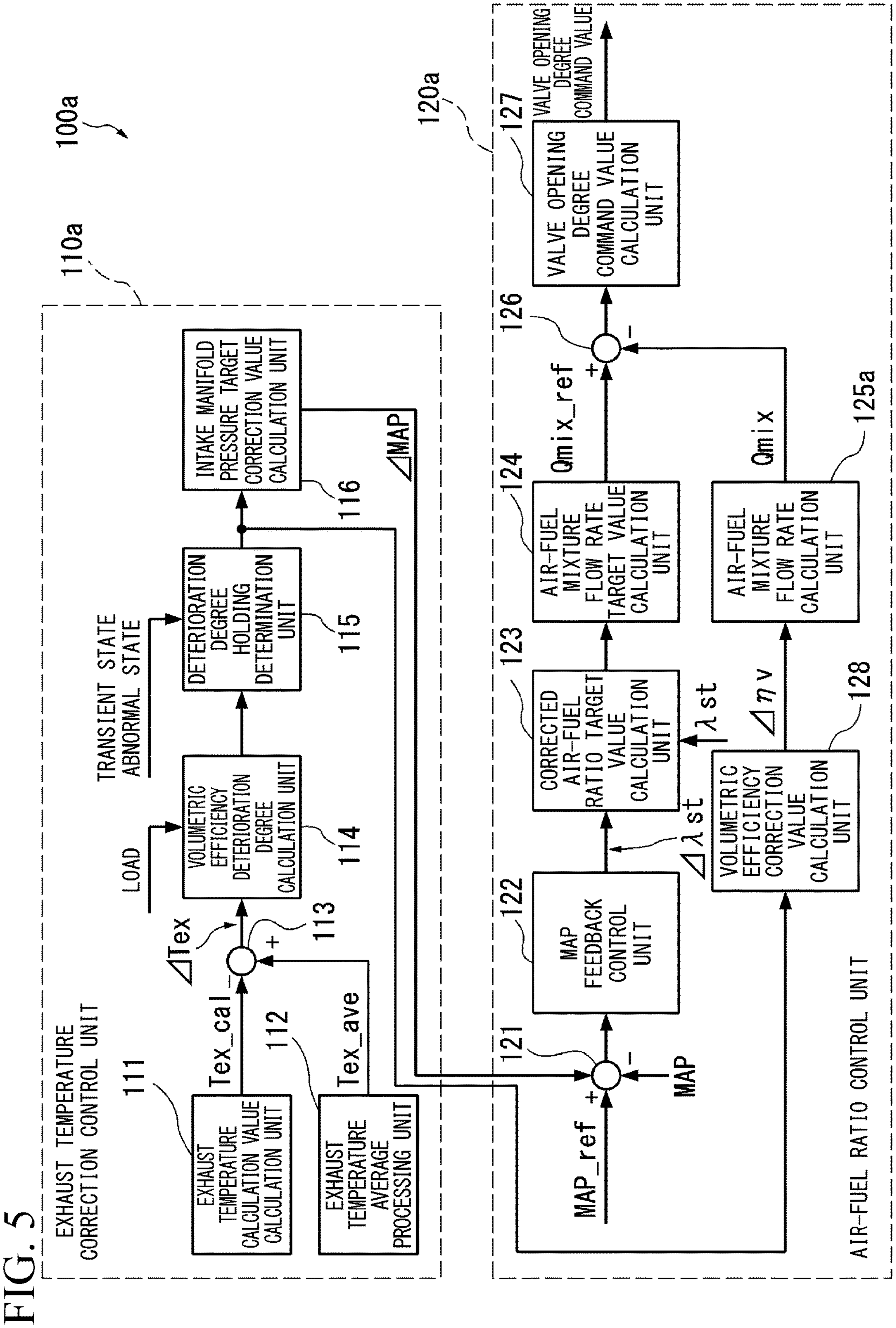
FIG. 5 is a block diagram showing a configuration example of a gas engine control device according to a second embodiment of the present disclosure.
Figure 6:
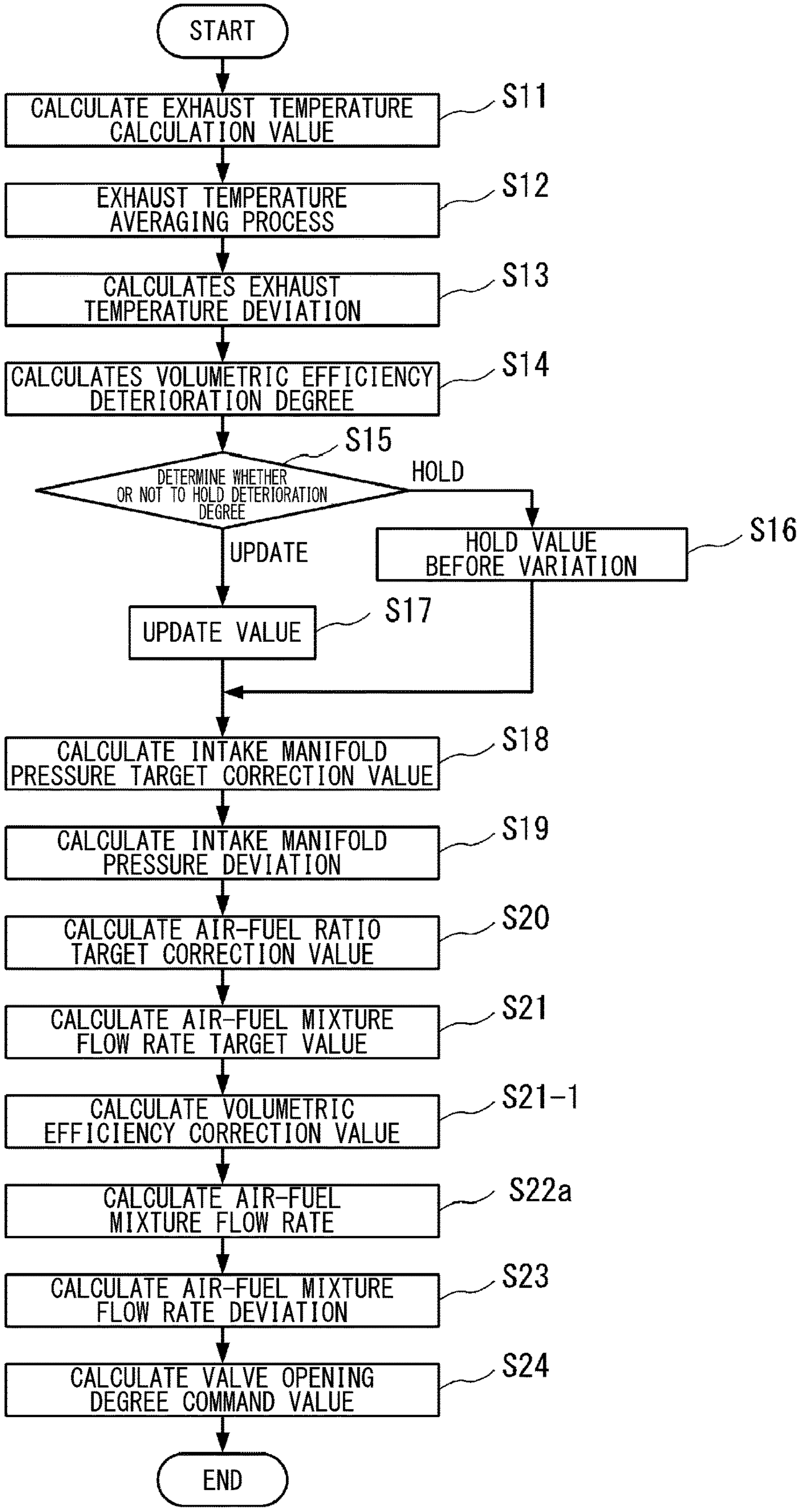
FIG. 6 is a flowchart showing an operation example of the gas engine control device according to the second embodiment of the present disclosure.
Figure 7:
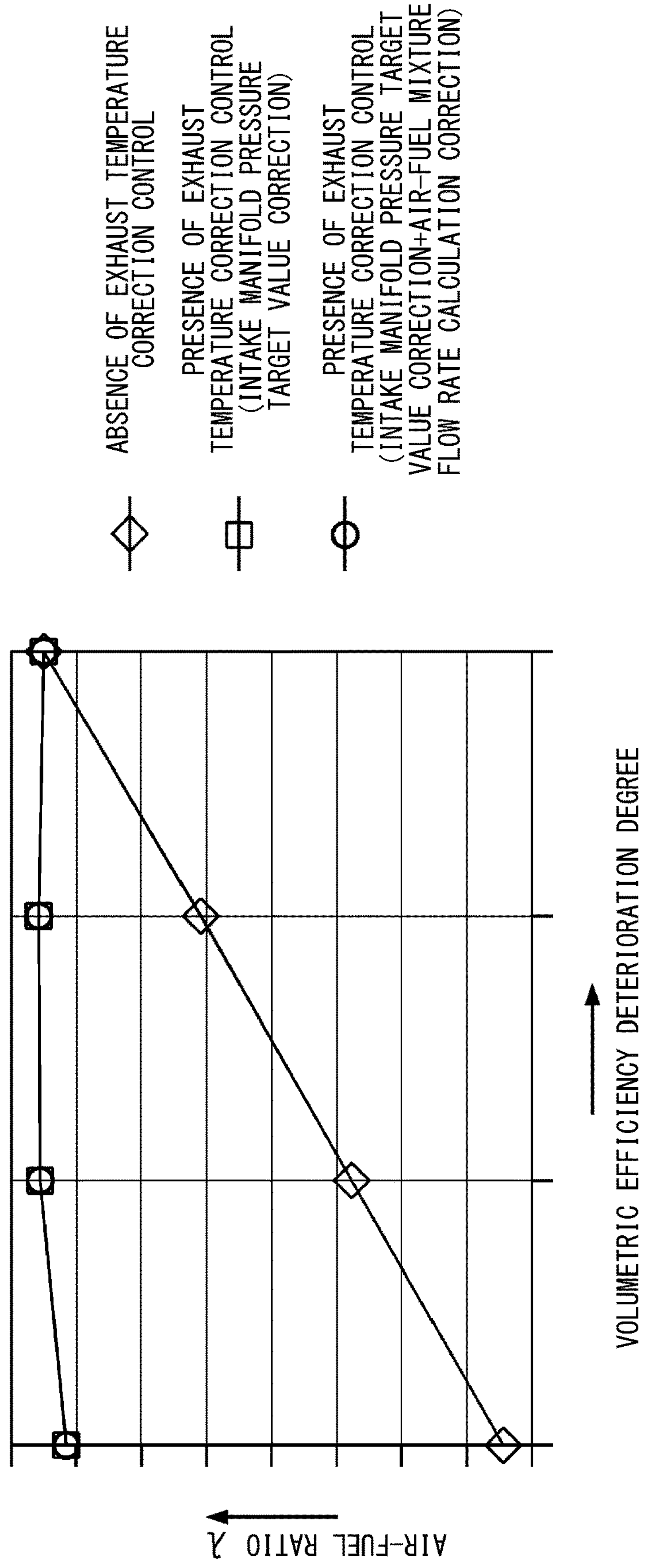
FIG. 7 is a characteristic diagram showing a simulation result of an operation example of the gas engine control device according to the second embodiment of the present disclosure.

Next, a gas engine control device (engine control device), a gas engine control method (engine control method), and a program according to a second embodiment of the present disclosure will be described with reference to FIGS. 5 to 7. FIG. 5 is a block diagram showing a configuration example of the gas engine control device according to the second embodiment of the present disclosure. FIG. 6 is a flowchart showing an operation example of the gas engine control device according to the second embodiment of the present disclosure. FIG. 7 is a characteristic diagram showing a simulation result of an operation example of the gas engine control device according to the second embodiment of the present disclosure.

A gas engine control device 100*a* of the second embodiment shown in FIG. 5 is different from the gas engine control device 100 of the first embodiment described with reference to FIGS. 1 and 2 in the following points. That is, the exhaust temperature correction control unit 110*a* shown in FIG. 5 corresponding to the exhaust temperature correction control unit 110 shown in FIG. 2 is different from the exhaust temperature correction control unit 110 shown in FIG. 2 in that the volumetric efficiency deterioration degree output from the deterioration degree holding determination unit 115 is output to an air-fuel ratio control unit 120*a* shown in FIG. 5 corresponding to the air-fuel ratio control unit 120 shown in FIG. 2. Further, the air-fuel ratio control unit 120*a* shown in FIG. 5 is different from the air-fuel ratio control unit 120 shown in FIG. 2 in that a volumetric efficiency correction value calculation unit 128 is newly provided and an air-fuel mixture flow rate calculation unit 125*a* shown in FIG. 5 corresponding to the air-fuel mixture flow rate calculation unit 125 shown in FIG. 2 calculates the air-fuel mixture flow rate Qmix by using a formula different from that of the first embodiment.

The volumetric efficiency correction value calculation unit 128 calculates the volumetric efficiency correction value Δηv based on the volumetric efficiency deterioration degree. Here, the volumetric efficiency correction value calculation unit 128 calculates the volumetric efficiency correction value Δηv to provide a correction margin equivalent to the intake manifold pressure target correction value ΔMAP calculated by the intake manifold pressure target correction value calculation unit 116 according to the volumetric efficiency deterioration degree. That is, the air increase rates due to the correction amount (intake manifold pressure target correction value ΔMAP) of the intake manifold pressure and the correction amount (volumetric efficiency correction value Δηv) of the volumetric efficiency are made equal to each other. For example, when the intake manifold pressure target correction value ΔMAP is corrected by 6 kPa every 10° C. of the exhaust temperature deviation ΔTex at the intake manifold pressure of 300 kPa and the load of 100%, this case corresponds to increasing the amount of air by 2%. In this case, the correction amount Δηv of the volumetric efficiency is calculated so that the amount of air increases by 2% every 10° C. of the exhaust temperature deviation ΔTex. In this way, in this embodiment, deterioration in stability due to combining two types of correction is prevented.

Further, the air-fuel mixture flow rate calculation unit 125*a* calculates the air-fuel mixture flow rate Qmix by using the following formula.

$$Qmix = \frac{Ne \times V \times \Delta\eta v \times \eta v}{2 \times 60} \times \frac{MAP}{MAT} \times \frac{Tk}{Patm} \quad \text{[Math. 5]}$$

The air-fuel mixture flow rate calculation unit 125*a* obtains the air-fuel mixture flow rate Qmix by using the volumetric efficiency correction value Δηv newly calculated by the volumetric efficiency correction value calculation unit 128. In this case, the air-fuel mixture flow rate calculation unit 125*a* multiplies the calculated value of the air-fuel mixture flow rate Qmix of the first embodiment by the correction value Δηv for the volumetric efficiency.

Additionally, in the second embodiment, when the exhaust temperature calculation value calculation unit 111 calculates the exhaust temperature calculation value, it is required to use the value before the volumetric efficiency correction is performed for the air-fuel mixture flow rate Gmix in the exhaust temperature calculation formula. In the second embodiment, since the volumetric efficiency deterioration degree or each correction value assumes a deviation at the time of the reference volumetric efficiency, it is necessary to obtain the exhaust gas temperature calculation value from the air-fuel mixture flow rate Gmix before correction.

In the second embodiment, the correction value ΔMAP for the intake manifold pressure target value is added to the intake manifold pressure target value to perform correction based on the volumetric efficiency deterioration degree and the correction value Δηv for the volumetric efficiency is multiplied by the calculated value of the air-fuel mixture flow rate Qmix to perform correction based on the volumetric efficiency deterioration degree.

According to this configuration, for example, if the throttle valve 14 is controlled by increasing the target MAP, the throttle opening degree is operated to the opening side. Further, since the volumetric efficiency is corrected, the air-fuel mixture flow rate air amount becomes a value that reflects aging deterioration and the deviation from the air-fuel mixture flow rate target value increases. That is, when the volumetric efficiency correction value calculated by the air-fuel mixture flow rate calculation unit 125*a* from the volumetric efficiency deterioration degree is multiplied by the air-fuel mixture flow rate before correction, the air-fuel mixture flow rate decreases by the correction amount and hence the air-fuel mixture flow rate deviation increases. Thus, for example, when the throttle valve 14 is controlled, the throttle is opened and the amount of air increases. As a result, since the amount of air increases and the air-fuel ratio λ which would be rich when the volumetric efficiency decreases is corrected to be lean, the NOx emission amount can be suppressed.

Additionally, a process shown in FIG. 6 is different from the process shown in FIG. 3 in the following points. That is, there is a different point in that a process of step S21-1 is newly added after the process of step S21. In step S21-1, the volumetric efficiency correction value calculation unit 128 calculates the volumetric efficiency correction value Δηv. Further, in step S22*a* corresponding to step S22 of FIG. 3, there is a different point in that the air-fuel mixture flow rate calculation unit 125*a* calculates the air-fuel mixture flow rate Qmix by using the volumetric efficiency correction value Δηv calculated by the volumetric efficiency correction value calculation unit 128. The other processes are the same as each other.

In the second embodiment, it is possible to calculate the correct air-fuel mixture amount that reflects deterioration and improve control accuracy by correcting the volumetric efficiency. Further, since an operation of increasing the amount of air is performed when the volumetric efficiency decreases, it is possible to suppress the emission of NOx by performing the air-fuel ratio control to be the lean air-fuel ratio λ.

Additionally, as shown in FIG. 7, according to the simulation result of the second embodiment, it was confirmed that the effect of the lean air-fuel ratio λ when both the intake manifold pressure target value correction and the air-fuel mixture flow rate calculation correction are performed is equivalent to that of the first embodiment.

Third Embodiment

Figure 8:
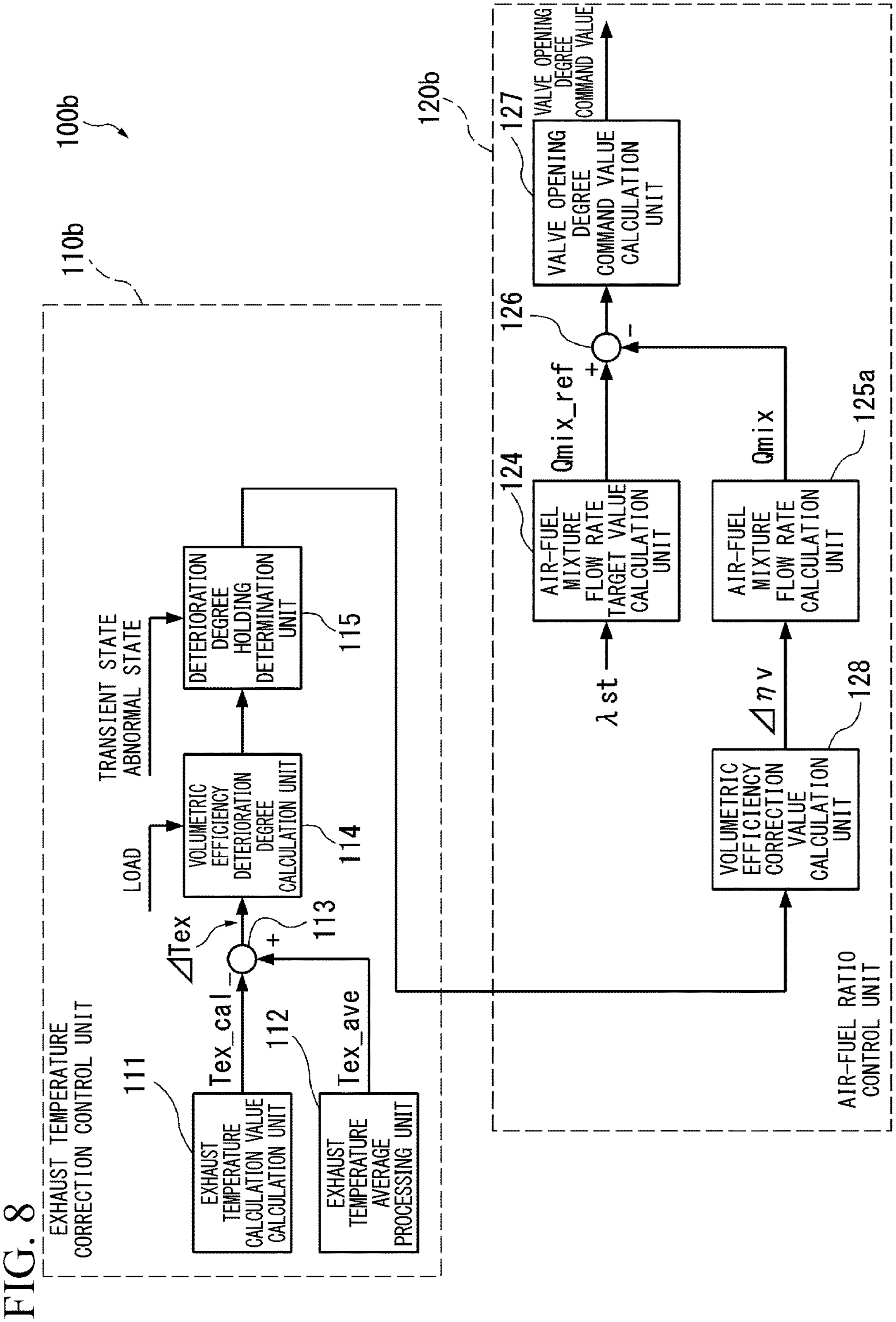
FIG. 8 is a block diagram showing a configuration example of a gas engine control device according to a third embodiment of the present disclosure.
Figure 9:
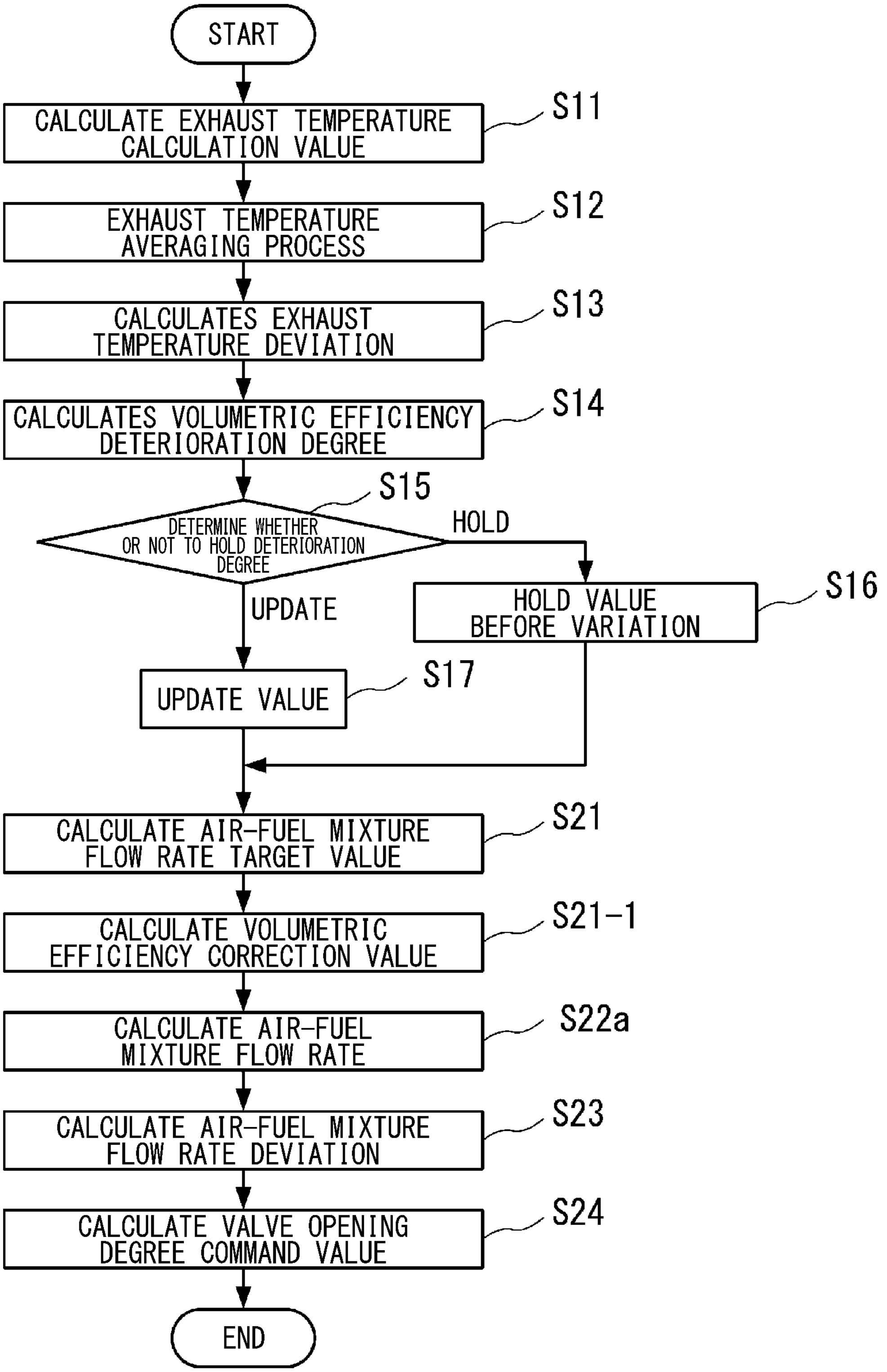
FIG. 9 is a flowchart showing an operation example of the gas engine control device according to the third embodiment of the present disclosure.
Figure 10:
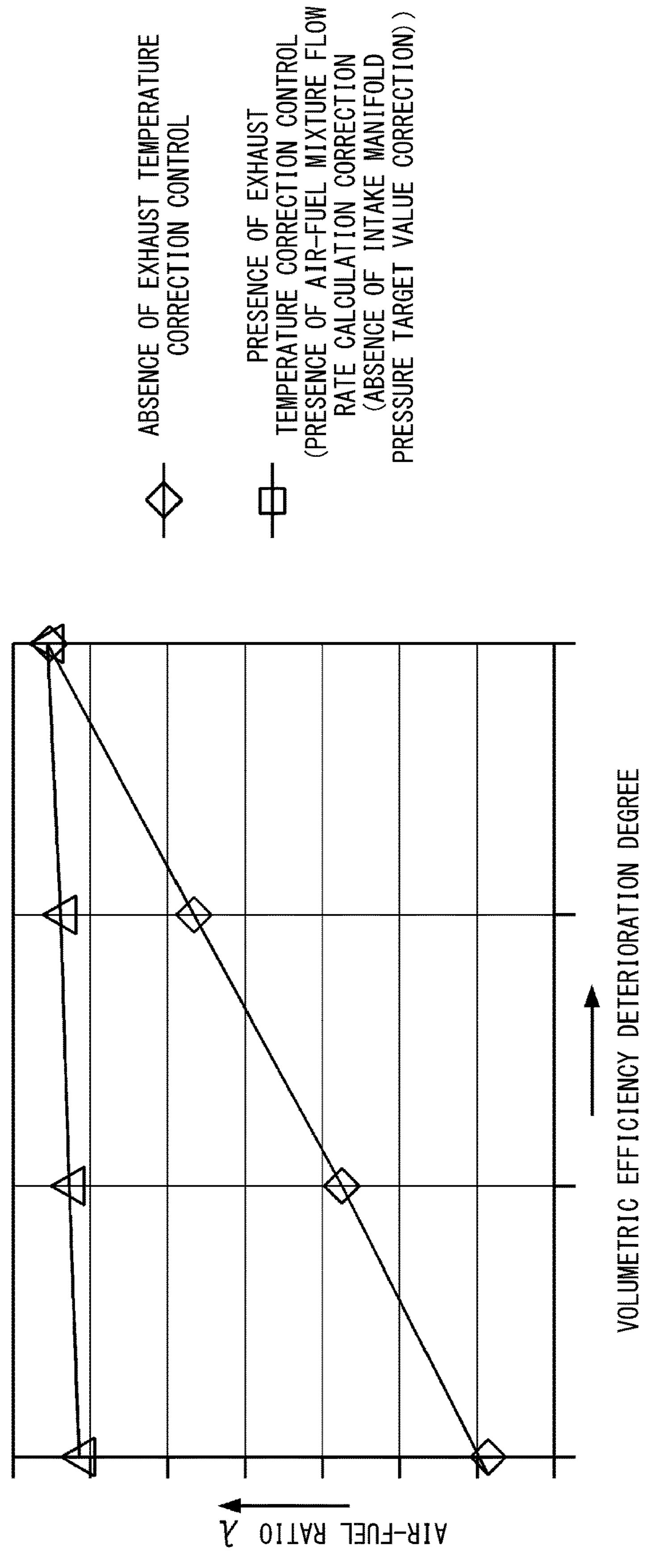
FIG. 10 is a characteristic diagram showing a simulation result of an operation example of the gas engine control device according to the third embodiment of the present disclosure.

Next, a gas engine control device (engine control device), a gas engine control method (engine control method), and a program according to a third embodiment of the present disclosure will be described with reference to FIGS. 8 to 10. FIG. 8 is a block diagram showing a configuration example of the gas engine control device according to the third embodiment of the present disclosure. FIG. 9 is a flowchart showing an operation example of the gas engine control device according to the third embodiment of the present disclosure. FIG. 10 is a characteristic diagram showing a simulation result of an operation example of the gas engine control device according to the third embodiment of the present disclosure.

A gas engine control device 100*b* of the third embodiment shown in FIG. 8 is different from the gas engine control device 100*a* of the second embodiment described with reference to FIG. 5 and the like in the following points. That is, there is a different point in that the intake manifold pressure target correction value calculation unit 116 shown in FIG. 5 is omitted in the exhaust temperature correction control unit 110*b* shown in FIG. 8 corresponding to the exhaust temperature correction control unit 110*a* shown in FIG. 5. Further, there is a different point in that the adder 121, the MAP feedback control unit 122, and the corrected air-fuel ratio target value calculation unit 123 shown in FIG. 5 are omitted in the air-fuel ratio control unit 120*b* shown in FIG. 8 corresponding to the air-fuel ratio control unit 120*a* shown in FIG. 5 and the air-fuel mixture flow rate target value calculation unit 124 calculates the air-fuel mixture flow rate target value Qmix_ref based on the theoretical air-fuel ratio (target air-fuel ratio) λst.

In the gas engine control device 100*b* of the third embodiment, the MAP feedback control function is disabled. In the third embodiment, since the volumetric efficiency is corrected, the air-fuel mixture flow rate air amount becomes a value that reflects aging deterioration and the deviation from the air-fuel mixture flow rate target value increases. As a result, for example, when the throttle valve 14 is controlled, the throttle is operated to the opening side to increase the amount of air, the air-fuel ratio λ which would be rich when the volumetric efficiency decreases is corrected to be lean, and the NOx emission amount can be suppressed.

Additionally, a process shown in FIG. 9 is different from the process shown in FIG. 6 in that the processes of step S18 to step S20 are omitted. Further, as shown in FIG. 10, according to the simulation result of the third embodiment, it was confirmed that the effect of the lean air-fuel ratio λ can be obtained by correcting the volumetric efficiency against the aging deterioration of the volumetric efficiency even when the MAP feedback control is disabled.

OTHER EMBODIMENTS

Although the embodiments of the present disclosure have been described in detail above with reference to the drawings, the specific configuration is not limited to this embodiment and includes design changes and the like within the scope of the present disclosure.

<Configuration of Computer>

Figure 11:
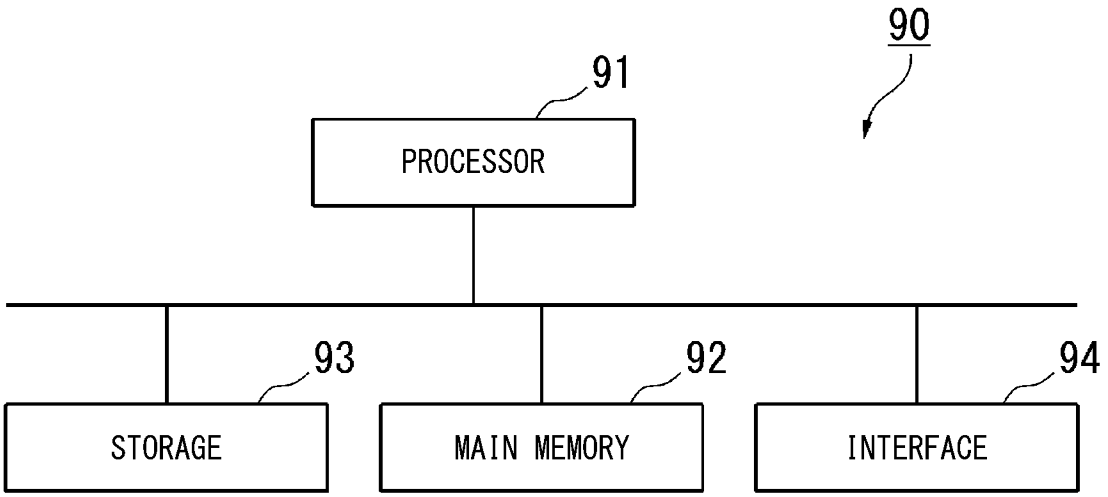
FIG. 11 is a schematic block diagram showing a configuration of a computer according to at least one embodiment.

FIG. 11 is a schematic block diagram showing a configuration of a computer according to at least one embodiment.

A computer 90 includes a processor 91, a main memory 92, a storage 93, and an interface 94.

The gas engine control devices 100, 100*a*, and 100*b* described above are mounted on the computer 90. Then, the operations of the above-described processing units are stored in the storage 93 in the form of a program. The processor 91 reads the program from the storage 93, develops the program in the main memory 92, and executes the above process according to the program. Further, the processor 91 secures storage areas corresponding to the storage units described above in the main memory 92 according to the program.

The program may be for realizing a part of the functions to be exhibited by the computer 90. For example, the program may function in combination with another program already stored in the storage or in combination with another program installed in another device. Additionally, in another embodiment, the computer may include a custom LSI (Large Scale Integrated Circuit) such as a PLD (Programmable Logic Device) in addition to or instead of the above configuration. Examples of PLD include PAL (Programmable Array Logic), GAL (Generic Array Logic), CPLD (Complex Programmable Logic Device), FPGA (Field Programmable Gate Array), and the like. In this case, some or all of the functions implemented by the processor may be implemented by the integrated circuit.

Examples of the storage 93 include HDD (Hard Disk Drive), SSD (Solid State Drive), magnetic disk, magneto-optical disk, CD-ROM (Compact Disc Read Only Memory), DVD-ROM (Digital Versatile Disc Read Only Memory), semiconductor memory, and the like. The storage 93 may be an internal medium directly connected to the bus of the computer 90 or an external medium connected to the computer 90 via an interface 94 or communication line. Further, when this program is transmitted to the computer 90 via a communication line, the computer 90 receiving the program may develop the program in the main memory 92 and execute the above process. In at least one embodiment, the storage 93 is a non-transitory and tangible storage medium.

APPENDIX

The gas engine control devices 100, 100*a*, and 100*b* of the embodiments are understood, for example, as below.

(1) The engine control device (the gas engine control devices 100, 100*a* and 100*b*) according to a first aspect corrects the opening degree of the valve (the throttle valve 14 or the exhaust bypass valve 26) that adjusts the intake amount of the air-fuel mixture of the engine 1 based on the exhaust temperature deviation ΔTex which is a deviation between the reference value Tex_cal and the current value Tex_ave of the exhaust temperature when controlling the opening degree. According to this aspect and the following aspects, since it is possible to calculate the correction value for the engine control in the normal control, there is no restriction of forcibly increasing or decreasing the operation amount and the correction value for the engine control can be easily calculated.

(2) The engine control device (the gas engine control devices 100, 100*a*, and 100*b*) according to a second aspect is the engine control device of (1) and the opening degree of the valve (the throttle valve 14 or the exhaust bypass valve 26) is controlled to control the air-fuel ratio λ of the air-fuel mixture at a predetermined value.

(3) The engine control device (the gas engine control devices 100, 100*a*, and 100*b*) according to a third aspect is the engine control device of (1) or (2) including the volumetric efficiency deterioration degree calculation unit 114 which calculates the volumetric efficiency deterioration degree based on the exhaust temperature deviation ΔTex and the load of the engine 1 and the opening degree of the valve (the throttle valve 14 or the exhaust bypass valve 26) is corrected based on the volumetric efficiency deterioration degree.

(4) The engine control device (the gas engine control devices 100, 100*a*, and 100*b*) according to a fourth aspect is the engine control device of (3) further including the deterioration degree holding determination unit 115 which determines whether or not the load varies and holds the volumetric efficiency deterioration degree at a value before variation when the load varies. According to this aspect, it is possible to stably calculate the volumetric efficiency deterioration degree.

(5) The engine control device (the gas engine control devices 100 and 100*a*) according to a fifth aspect is the engine control device of (3) or (4) including the intake manifold pressure target correction value calculation unit 116 which calculates the intake manifold pressure target correction value ΔMAP which is a correction value of the target value of a pressure (hereinafter, referred to as an intake manifold pressure) of the intake manifold 11 of the engine 1 based on the volumetric efficiency deterioration degree, the intake manifold pressure feedback control unit (the MAP feedback control unit 122) which calculates the air-fuel ratio target correction value Δλst which is a correction value of the target value of the air-fuel ratio of the air-fuel mixture as an operation amount of the feedback control based on the intake manifold pressure deviation which is a deviation between a value obtained by correcting the target value MAP_ref of the intake manifold pressure by the intake manifold pressure target correction value ΔMAP and the current value MAP of the intake manifold pressure, the air-fuel mixture flow rate target value calculation unit 124 which calculates the air-fuel mixture flow rate target value Qmix_ref based on a value obtained by correcting the target value of the air-fuel ratio by the air-fuel ratio target correction value, and the valve opening degree command value calculation unit 127 which calculates the opening degree command value of the valve (the throttle valve 14 or the exhaust bypass valve 26) based on the deviation between the air-fuel mixture flow rate target value Qmix_ref and the current value Qmix of the flow rate of the air-fuel mixture.

(6) The engine control device (the gas engine control device 100*a*) according to a sixth aspect of the engine control device of (5) and the current value Qmix of the flow rate of the air-fuel mixture is a value corrected based on the volumetric efficiency deterioration degree.

(7) The engine control device (the gas engine control devices 100*a* and 100*b*) is the engine control device of (3) or (4) including the air-fuel mixture flow rate target value calculation unit 124 which calculates the air-fuel mixture flow rate target value Qmix_ref and the valve opening degree command value calculation unit 127 which calculates the opening degree command value of the valve (the throttle valve 14 or the exhaust bypass valve 26) based on the deviation between the air-fuel mixture flow rate target value Qmix_ref and a value obtained by correcting the current value Qmix of the flow rate of the air-fuel mixture based on the volumetric efficiency deterioration degree.

INDUSTRIAL APPLICABILITY

According to each aspect of the present invention, it is possible to easily calculate a correction value in engine control.

REFERENCE SIGNS LIST

1 Engine
3 Cylinder
10 Engine cylinder
11 Intake manifold
12 Turbocharger
12*c* Compressor
12*t* Turbine
13 Cylinder block
14 Throttle valve
22 Exhaust manifold
24 Exhaust pipe
25 Exhaust bypass passage
26 Exhaust bypass valve
60 Intake manifold pressure sensor
62 Intake manifold temperature sensor
64 Exhaust temperature sensor
66 Engine rotation speed sensor
100 Gas engine control device (engine control device)

The invention claimed is:

1. An engine control device for controlling an opening degree of a valve adjusting a flow rate of an air-fuel mixture of an engine,
- wherein the opening degree is corrected based on an exhaust temperature deviation which is a deviation between a reference value and a current value of an exhaust temperature when controlling the opening degree,
- wherein the engine control device further comprising a volumetric efficiency deterioration degree calculation unit which calculates a volumetric efficiency deterioration degree based on the exhaust temperature deviation and a load of the engine,
- wherein the opening degree is corrected based on the volumetric efficiency deterioration degree, and
- wherein the engine control device further comprising a deterioration degree holding determination unit which determines whether or not the load varies and holds the volumetric efficiency deterioration degree at a value before variation when the load varies.

2. The engine control device according to claim 1,
- wherein the opening degree of the valve is controlled so that an air-fuel ratio of the air-fuel mixture is controlled at a predetermined value.

3. The engine control device according to claim 1, further comprising:
- an intake manifold pressure target correction value calculation unit which calculates an intake manifold pressure target correction value which is a correction value of a target value of a pressure of an intake manifold of the engine based on the volumetric efficiency deterioration degree;
- an intake manifold pressure feedback control unit which calculates an air-fuel ratio target correction value which is a correction value of a target value of the air-fuel ratio of the air-fuel mixture as an operation amount of feedback control based on an intake manifold pressure deviation which is a deviation between a value obtained by correcting the target value of the intake manifold pressure by the intake manifold pressure target correction value and a current value of the intake manifold pressure;
- an air-fuel mixture flow rate target value calculation unit which calculates an air-fuel mixture flow rate target value based on a value obtained by correcting the target value of the air-fuel ratio by the air-fuel ratio target correction value; and
- a valve opening degree command value calculation unit which calculates an opening degree command value of the valve based on a deviation between the air-fuel mixture flow rate target value and a current value of the flow rate of the air-fuel mixture.

4. The engine control device according to claim 3,
- wherein a current value of a flow rate of the air-fuel mixture is a value corrected based on the volumetric efficiency deterioration degree.

5. The engine control device according to claim 1, further comprising:

an air-fuel mixture flow rate target value calculation unit which calculates an air-fuel mixture flow rate target value; and a valve opening degree command value calculation unit which calculates an opening degree command value of the valve based on a deviation between the air-fuel mixture flow rate target value and a value obtained by correcting a current value of the flow rate of the air-fuel mixture based on the volumetric efficiency deterioration degree.

6. An engine control method of controlling an opening degree of a valve adjusting a flow rate of an air-fuel mixture of an engine, comprising:

correcting the opening degree based on an exhaust temperature deviation which is a deviation between a reference value and a current value of an exhaust temperature when controlling the opening degree, wherein the engine control method further comprising a step of calculating a volumetric efficiency deterioration degree based on the exhaust temperature deviation and a load of the engine, wherein, in the step of correcting the opening degree, the opening degree is corrected based on the volumetric efficiency deterioration degree, and wherein the engine control method further comprising a step of determining whether or not the load varies and holds the volumetric efficiency deterioration degree at a value before variation when the load varies.

7. A non-transitory computer-readable recording medium that stores a program allowing a computer to execute a step of correcting an opening degree of a valve adjusting a flow rate of an air-fuel mixture of an engine based on an exhaust temperature deviation which is a deviation between a reference value and a current value of an exhaust temperature when controlling the opening degree, wherein the program further allowing the computer to execute a step of calculating a volumetric efficiency deterioration degree based on the exhaust temperature deviation and a load of the engine, wherein, in the step of correcting the opening degree, the opening degree is corrected based on the volumetric efficiency deterioration degree, and wherein the program further allowing the computer to execute a step a step of determining whether or not the load varies and holds the volumetric efficiency deterioration degree at a value before variation when the load varies.

* * * * *